United States Patent [19]

Shiga

[11] 4,363,951
[45] Dec. 14, 1982

[54] BOTH-SIDE SINGLE LAYER, HIGH SPEED SUBMERGED ARC WELDING PROCESS

[75] Inventor: Atsushi Shiga, Chiba, Japan

[73] Assignee: Kawasaki Steel Corporation, Kobe, Japan

[21] Appl. No.: 240,507

[22] Filed: Mar. 4, 1981

[30] Foreign Application Priority Data

Feb. 17, 1981 [JP] Japan .................................. 56-20831

[51] Int. Cl.$^3$ .............................................. B23K 9/18
[52] U.S. Cl. ..................................... 219/73; 219/73.2; 219/73.21; 219/146.24
[58] Field of Search ....... 219/73 R, 137 WM, 146.24, 219/73.2, 73.21

[56] References Cited

U.S. PATENT DOCUMENTS

| | | | |
|---|---|---|---|
| 3,867,608 | 2/1975 | Ohwa et al. | 219/73 R |
| 3,919,517 | 11/1975 | Ishizaki et al. | 219/73 R |
| 4,020,312 | 4/1977 | Araki et al. | 219/73 R X |
| 4,131,781 | 12/1978 | Ito et al. | 219/146.24 X |
| 4,131,781 | 12/1978 | Ito et al. | 219/73 |
| 4,196,335 | 4/1980 | Ikeda et al. | 219/73 |
| 4,256,949 | 3/1981 | Baumann et al. | 219/73.2 X |

OTHER PUBLICATIONS

G. G. Wittstock, Selecting Submerged Arc Fluxes for Carbon and Low Alloy Steels, WELDING JOURNAL, Sep. 1976, pp. 733 to 741.

Primary Examiner—R. R. Kucia
Attorney, Agent, or Firm—Balogh, Osann, Kramer, Dvorak, Genova & Traub

[57] ABSTRACT

A process for both-side single layer, high speed submerged arc welding of steel plate for use in low-temperature applications having a particular chemical composition with a welding flux and welding wire is disclosed. The welding flux comprises 20 to 30 wt % of $SiO_2$, less than 25 wt % of at least one of $TiO_2$ and $ZrO_2$, 10 to 20 wt % of CaO, less than 10 wt % of at least one of MnO and MgO, not more than 10 wt % of $Al_2O_3$ and 20 to 40 wt % in total of $CaF_2$ and BaO each being not more than 20 wt %, wherein a total content of acidic components ($SiO_2$ % + $TiO_2$ % + $ZrO_2$ %) is 30 to 45 wt %, a total content of basic components (CaO % + MgO % + MnO %) is 20 to 30 wt % and a weight ratio of the total content of basic components to the total content of acidic components is within a range of 0.5 to 0.8; said these components being compounded so that a surface tension F of slag is not more than 450 dyne/cm as calculated from the following equation (1):

$$F = 285 \times [SiO_2] + 380 \times [TiO_2] + 470 \times [ZrO_2] + 640 \times [Al_2O_3] + 653 \times [MnO] + 512 \times [MgO] + 602 \times [CaO] + 400 \times [CaF_2] + 366 \times [BaO] \quad (1)$$

wherein a parenthesis represents a mol fraction of each component. The welding wire is composed of a steel wire containing up to 0.10 wt % of carbon, up to 0.4 wt % of silicon, 1.0 to 2.5 wt % of manganese, 0.015 to 0.05 wt % of aluminum, not more than 0.008 wt % of nitrogen, 0.10 to 0.18 wt % to titanium and 0.01 to 0.02 wt % of boron. The welding flux and welding wire are used in combination with each other so that a carbon equivalent $C_E$ of the resulting weld metal is 0.35 to 0.43% as calculated from the following equation (2):

$$C_E(\%) = C(\%) + 1/24 Si(\%) + 1/6 Mn(\%) + 1/4 Mo(\%) + 1/5 Cr(\%) + 1/40 Ni(\%) + 1/14 V(\%) \quad (2)$$

to thereby obtain a weld metal containing not more than 0.008 wt % of nitrogen, 0.025 to 0.035 wt % of oxygen, 0.0015 to 0.0030 wt % of boron, 0.015 to 0.030 wt % of titanium and 0.010 to 0.030 wt % of aluminum and having a high low-temperature toughness without weld defects.

3 Claims, 2 Drawing Figures

BOTH-SIDE SINGLE LAYER, HIGH SPEED SUBMERGED ARC WELDING PROCESS

This invention relates to a process for both-side single layer, high speed submerged arc welding. More particularly, this invention is to provide a novel process for both-side single layer, high speed submerged arc welding of steel plate for use in low-temperature applications such as steel pipes or other steel structures, which gives a combination of a welding flux and a welding wire adaptable to advantageously produce a weld metal having high welding efficiency and low-temperature toughness without weld defects.

In the high speed submerged arc welding, a low basicity fused flux consisting mainly of $SiO_2$, $TiO_2$ and MnO is generally used, whereby a weld metal having a good bead appearance is usually obtained without weld defects such as slag inclusion, undercut and the like. However, with the great advance of development of pipe-lines at cold districts, ambient temperature in use of steel pipes becomes severe, so that it is strongly demanded to impart a high low-temperature toughness to the weld metal. Therefore, it is a tendency to use a combination of a high basicity flux containing a large content of CaO, MgO and the like and a welding wire containing Ti and B in the both-side single layer submerged arc welding process, which is disclosed, for example, in U.S. Pat. Nos. 3,867,608 and 3,919,517.

In the combination of the high basicity flux and the welding wire as described above, however, the contents of CaO, MgO and MnO are relatively large as compared with the contents of $SiO_2$, $TiO_2$ and the like, so that slag produced from the high basicity flux is generally high in the melting point and surface tension. As a result, when the submerged arc welding is carried out at high speed, it is apt to often cause the slag inclusion. On the other hand, it is primarily known that the presence of boron in the weld metal controls the formation of proeutectoid ferrite at austenite grain boundaries during the cooling of the weld metal to improve the toughness of the weld metal. However, B supplied from the wire reacts with oxygen, nitrogen and the like during the submerged arc welding to form oxide, nitride and the like, which do not contribute to control the formation of preeutectoid ferrite. In order to prevent the formation of the oxide, nitride and the like of boron, it is required to add titanium to the B-containing wire, but Ti is existent in the form of $TiO_2$, TiN and solid solution in the weld metal. Especially, the presence of Ti in solid solution disadvantageously acts to obstruct the effect of B.

That is, when the combination of the presently commercial available welding flux and wire is used as a welding material for steel plate used in low-temperature applications, if steel plates of, for example, 18 mm thick are subjected to a both-side single layer submerged arc welding at a speed as high as about 120 cm/min, weld defects are often produced due to the slag inclusion, while the effect of boron to the toughness improvement of the weld metal may not be realized at times due to the variation of oxygen and nitrogen contents in the weld metal. In the actual procedure, therefore, the repair welding is unfortunately adopted as a premise condition or it is obliged to employ multilayer welding at the sacrifice of welding efficiency.

The inventor has made various investigations and experiments in order to advantageously overcome the above mentioned drawbacks and to provide a novel combination of welding flux and welding wire, which can impart a high low-temperature toughness to weld metal without causing weld defects such as slag inclusion, undercut and the like even if the both-side single layer submerged arc welding is performed at a high speed, and found out the following facts, from which the invention has been accomplished.

Firstly, it has been found that a rate of formation of slag inclusion in the submerged arc welding is related to a surface tension of the slag and besides the content of oxygen in the weld metal is substantially determined by limiting the composition of the flux in compliance with the above relationship. Secondly, it has been found that the improvement of toughness by the action of B as previously mentioned depends upon the content of nitrogen in the weld metal together with the oxygen content in connection with proper contents of Ti and Al. And also, it has been found that the content of carbon and carbon equivalent in the weld metal have a strong influence on the toughness improvement.

The term "carbon equivalent ($C_E$)" used herein is given by a chemical composition of a weld metal considering an yield or the increase and decrease of alloying components contained in a steel plate to be subjected to a both-side single layer submerged arc welding and components of a welding wire due to evaporation by a heat of arc and oxidation-reduction by slag-metal reaction.

According to the invention, there is the provision of a process for both-side single layer, high speed submerged arc welding of steel plate for use in low-temperature applications such as steel pipes or other steel structures and containing up to 0.1 wt% of carbon, up to 0.35 wt% of silicon, 0.5 to 2.0 wt% of manganese, 0.01 to 0.1wt% of aluminum and not more than 0.010 wt% of nitrogen with a welding flux and a welding wire, the improvement in which said welding flux comprises 20 to 30 wt% of $SiO_2$, less than 25 wt% of at least one of $TiO_2$ and $ZrO_2$, 10 to 20 wt% of CaO, less than 10 wt% of at least one of MnO and MgO, not more than 10 wt% of $Al_2O_3$ and 20 to 40 wt% in total of $CaF_2$ and BaO each being not more than 20 wt%, wherein a total content of acidic components ($SiO_2\%+TiO_2\%+ZrO_2\%$) is 30 to 45 wt%, a total content of basic components ($CaO\%+MgO\%+MnO\%$) is 20 to 30 wt% and a weight ratio of the total content of basic components to the total content of acidic components is within a range of 0.5 to 0.8; said these components being compounded so that a surface tension F of slag is not more than 450 dyne/cm as calculated from the following equation (1):

$$F=285\times[SiO_2]+380\times[TiO_2]+470\times[ZrO_2]+640\times[Al_2O_3]+653\times[MnO]+512\times[MgO]+602\times[CaO]+400\times[CaF_2]+366\times[BaO] \quad (1)$$

wherein a parenthesis represents a mol fraction of each component; said welding wire is composed of a steel wire containing up to 0.10 wt% of carbon, up to 0.4 wt% of silicon, 1.0 to 2.5 wt% of manganese, 0.015 to 0.05 wt% of aluminum, not more than 0.008 wt% of nitrogen, 0.10 to 0.18 wt% of titanium and 0.01 to 0.02 wt% of boron; said welding flux and welding wire are used in combination with each other so that a carbon equivalent $C_E$ of the resulting weld metal is 0.35 to 0.43% as calculated from the following equation (2):

$$C_E(\%) = C(\%) + 1/24 Si(\%) + 1/6 Mn(\%) + 1/4 Mo(\%) + 1/5 Cr(\%) + 1/40 Ni(\%) + 1/14 V(\%) \qquad (2)$$

to thereby obtain a weld metal containing not more than 0.008 wt% of nitrogen, 0.025 to 0.035 wt% of oxygen, 0.0015 to 0.0030 wt% of boron, 0.015 to 0.030 wt% of titanium and 0.010 to 0.030 wt% of aluminum and having a high low-temperature toughness without weld defects.

The invention will now be described in detail with reference to the accompanying drawings, wherein.

Throughout the following description, all percents for components will be understood to mean percent by weight.

In the both-side single layer, high speed submerged arc welding according to the invention, there are used steel plates to be used in steel pipes for pipe-line or other steel structures, which contain up to 0.1% of C, up to 0.35% of Si, 0.5–2.0% of Mn, 0.01–0.1% of Al and not more than 0.010% of N, but use may be made of steel plates further containing at least one element selected from the group consisting of not more than 0.1% of Nb and V, not more than 0.5% of each of Mo, Cr and Cu and not more than 3.5% of Ni as a reinforcing or modifying component in addition to the above defined components. In any case, the reason why the composition of the steel plate to be used is limited to the above components is based on the fact that these components have an indivisible relation to the components of the welding wire in connection with the chemical composition of the weld metal as mentioned below in detail.

According to the invention, the reason why the chemical composition of the welding flux is limited to the above mentioned range is based on the experimental results established by the following experiment.

Figure 1:
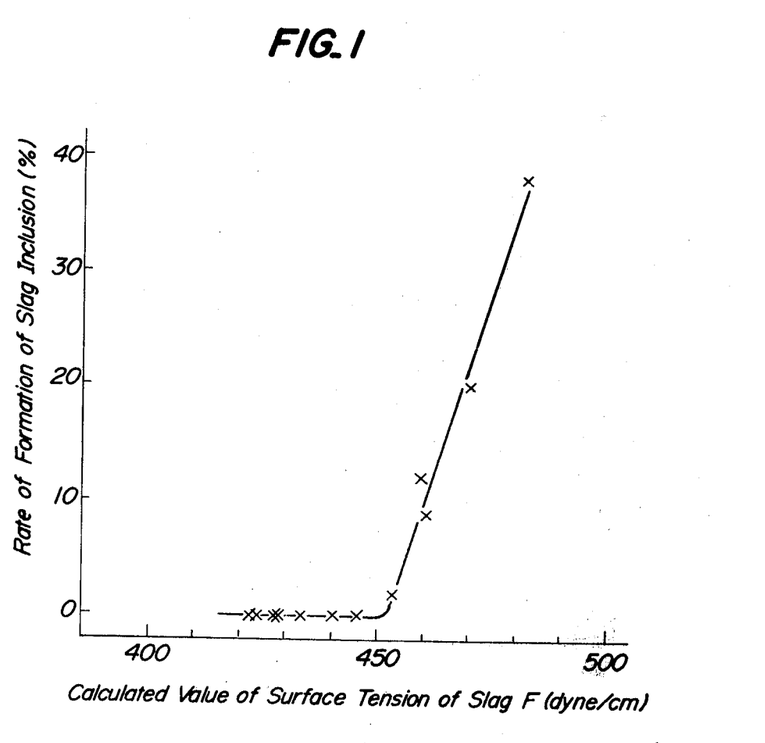
FIG. 1 is a graph showing an influence of the calculated value of slag surface tension according to the equation (1) on the rate of formation of slag inclusion.

That is, when a both-side single layer, high speed submerged arc welding was applied to a UO-press shaped steel pipe at a flat position against the inner and outer surfaces over a whole length of 12 m, the rate of formation of slag inclusion was measured by using a welding flux having a different chemical composition. As a result, it has been found that the rate of formation of slag inclusion can be related to a surface tension F of a slag formed from the welding flux as shown in FIG. 1 and the weld defects are not caused at a welding speed of not less than 120 cm/min when the value of F is not more than 450 dyne/cm. In FIG. 1, an abscissa represents the surface tension F of the slag expressed by the following equation (1), which is recognized by the inventor:

$$F = 285 \times [SiO_2] + 380 \times [TiO_2] + 470 \times [ZrO_2] + 640 \times [Al_2O_3] + 653 \times [MnO] + 512 \times [MgO] + 602 \times [CaO] + 400 \times [CaF_2] + 366 \times [BaO] \qquad (1)$$

wherein a parenthesis represents a mol fraction of each component of the flux.

Since a fused flux is generally used in the welding of this type, it may be considered that the composition of the flux is substantially the same as that of the slag. Therefore, the surface tension of the slag can be calculated according to the equation (1) by adopting the composition of the flux.

As apparent from the equation (1), it is preferable that the contents of $SiO_2$, $TiO_2$, BaO and $CaF_2$ are made large because their surface tension coefficients are relatively small, while the contents of CaO, MgO, MnO and particularly $Al_2O_3$ are made small because their surface tension coefficients are relatively large. As previously mentioned, the high basicity flux, wherein CaO, MgO, MnO and the like are compounded in relatively large amounts as compared with $SiO_2$, $TiO_2$ and $ZrO_2$, is unsuitable for the prevention of slag inclusion. On the other hand, the conventional fluxes for high speed welding, for example a flux containing large contents of $SiO_2$ and $TiO_2$ are suitable for the welding without weld defects owing to the low surface tension, but can not impart a sufficiently high toughness even in combination use with a B-containing wire because the oxygen content of the resulting weld metal becomes excessive as mentioned below.

In order that the value of surface tension of slag calculated according to the equation (1) is not more than 450 dyne/cm, according to the invention, the composition of the welding flux is first limited as follows: that is, the lower limit of the total content of acidic components $SiO_2$, $TiO_2$ and $ZrO_2$ is 30%, the upper limit of the total content of basic components CaO, MgO and MnO is 30%, and the upper limit of the weight ratio of $CaO + MgO + MnO / SiO_2 + TiO_2 + ZrO_2$ is 0.8, whereby the acidic components are used in relatively large amounts as compared with the basic components as main components of the flux. Further, CaO having a high surface tension coefficient is not more than 20%, MnO having a higher surface tension coefficient is less than 10%, $Al_2O_3$ having a higher surface tension coefficient is not more than 10%, and MgO is less than 10% in connection with the total content of basic components, all of which are upper limits.

On the other hand, in order to prevent the irregularity of bead edge during the high speed welding, it is necessary that the lower limit of $SiO_2$ is 20%, the upper limit of $CaF_2$ is 20% and the upper limit of the total content of $CaF_2$ and BaO is 40%. Furthermore, since the feature that the total content of basic components is smaller than the total content of acidic components has a tendency to control the increase of the oxygen content in the weld metal, it is necessary that the lower limit of the total content of basic components is 20%, the upper limit of the total content of acidic components is 45%, the lower limit of CaO is 10%, the upper limit of $SiO_2$ is 30%, the lower limit of the weight ratio of $CaO + MgO + MnO / SiO_2 + TiO_2 + ZrO_2$ is 0.5, and the lower limit of $CaF_2 + BaO$ is 20%.

Moreover, it has been found that when the both-side single layer, high speed submerged arc welding is performed by using the welding flux having the above defined chemical composition corresponding to the surface tension of slag of not more than 450 dyne/cm, the oxygen content of the weld metal is stabilized within a narrow range of 0.025 to 0.035%.

In this connection, the welding flux having a chemical composition defined by the invention has a basicity of not more than +0.7 as calculated from the following equation:

Basicity = $0.108 CaO(\%) + 0.068 MnO(\%) + 0.100 MgO(\%) - 0.105 SiO_2(\%) - 0.002 Al_2O_3(\%) - 0.061 TiO_2(\%) + 0.056 CaF_2(\%)$, which is disclosed in U.S. Pat. No. 3,867,608, or of not more than 1.0 as calculated from the following equation:

Basicity = [0.108CaO(%) + 0.068MnO(%) + 0.10-MgO(%)] / [0.105SiO$_2$(%) + 0.002Al$_2$O$_3$(%)], which is disclosed in U.S. Pat. No. 3,919,517. Although the basicity of the flux according to the invention is fairly lower than that defined in the prior art references, it has been confirmed that the flux according to the invention produces no weld defects such as slag inclusion or the like during the both-side single layer, high speed submerged arc welding. On the contrary, all of the fluxes described in the prior art references indicate the surface tension F of slag of more than 450 dyne/cm as calculated according to the equation (1) of the invention, so that those conventional fluxes are understood to be unacceptable for the both-side single layer, high speed submerged arc welding.

The feature that the oxygen content of the weld metal is stabilized within a narrow range of 0.025–0.035% when using the welding flux according to the invention as previously mentioned considerably contributes to improve the low-temperature toughness of the weld metal as follows. That is, reasonable contents of B and Ti in the weld metal and carbon equivalent $C_E$ of the weld metal changes in compliance with the oxygen content of the weld metal. According to the invention, the reasonable B content is 0.0015–0.0030% in order that the structure of the weld metal is acicular ferrite, the reasonable Ti content is 0.015–0.030%, and the reasonable value of $C_E$ is 0.35–0.43%. Furthermore, Al = 0.010–0.030%, N ≤ 0.0080% and C ≤ 0.10% are indispensable in the weld metal for effectively developing the actions of B and Ti. The technical meaning of these limitations is as follows.

When the oxygen content is within a range of 0.025–0.035%, if the B content is less than 0.0015%, a most part of B is converted into oxide or nitride and does not control the formation of proeutectoid ferrite, while if the B content exceeds 0.0030%, there is a risk of producing cracks.

The reason why the Ti content is limited to 0.015–0.030% is as follows. That is, when the oxygen content is 0.025–0.035%, if the Ti content is less than 0.015%, ferrite is not finely dispersed in austenite grains and also all of B is converted into oxide or nitride, while if the Ti content exceeds 0.030%, Ti in solid solution is produced to form a bainite structure, which degrades the toughness.

The reason why the Al content is limited to 0.010–0.030% is based on the following fact. That is, when the Al content is the above defined range, the above defined content of Ti is converted into TiN without the formation of oxide at a temperature higher than that for the formation of BN during the cooling of the weld metal. In other words, N is fixed with Ti in the presence of Al.

The reason why the N content is limited to not more than 0.0080% is based on the fact that when the N content exceeds the above value, all of B added is converted into nitride and consequently the addition effect of B for the control of proeutectoid ferrite is not developed.

Figure 2:
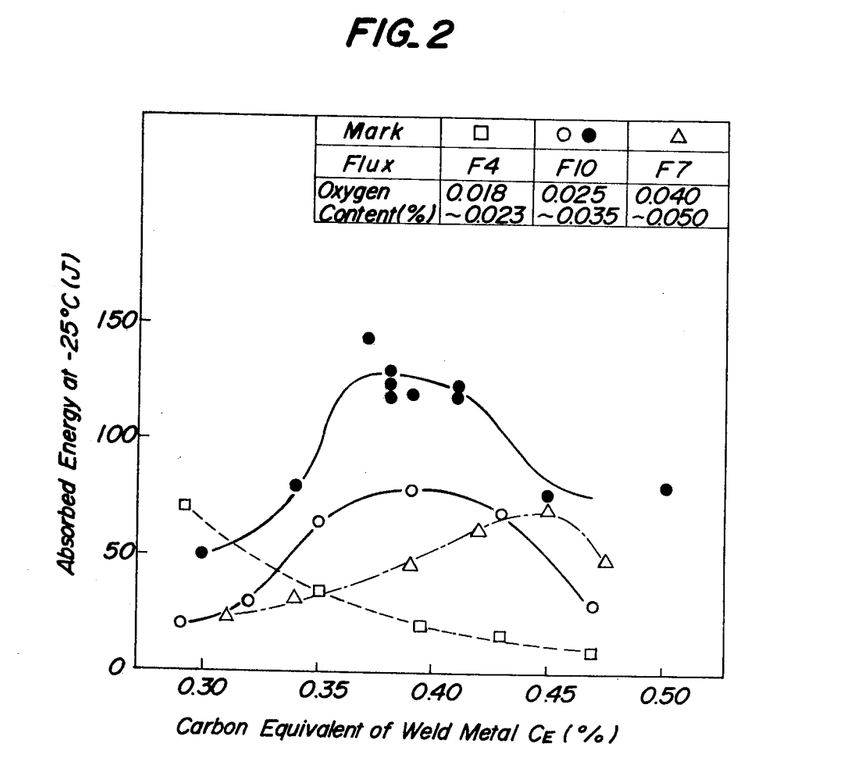
FIG. 2 is a graph showing a relation between the carbon equivalent of the weld metal and the impact toughness every a certain range of the oxygen content in the weld metal.

As to the compositions of the steel plate and welding wire according to the invention, the carbon equivalent of the weld metal was first changed by varying the composition of the steel plate and wire, during which the influence of carbon equivalent on the toughness of the weld metal was examined every a certain range of the oxygen content in the weld metal to obtain a result as shown in FIG. 2. In this case, the steel plates having a thickness of 18 mm were formed with 70° double Vee groove on the sides thereof and were subjected to a both-side single layer submerged arc welding under the following conditions. Thereafter, a preliminary impact test was made with respect to the resulting weld metal to obtain test results as shown in FIG. 2. In the preliminary test, four kinds of steel plates, symbol S 1, 2, 3 and 4 listed in the following Table 1, and three kinds of fluxes, symbol F 4, 7 and 10 listed in the following Table 2 were used in combination with six kinds of wires listed in the following Table 3.

| Welding conditions | First electrode | Second electrode | Third electrode | Welding speed |
|---|---|---|---|---|
| First pass | 1050A-35V | 750A-42V | 600A-42V | 120 cm/min |
| Second pass | 1100A-35V | 850A-42V | 700A-42V | 130 cm/min |

TABLE 1

| | | Chemical composition of steel plate (%) | | | | | | | | | | | |
|---|---|---|---|---|---|---|---|---|---|---|---|---|---|
| Symbol | Thickness (mm) | C | Si | Mn | P | S | Ni | Cu | Cr | Mo | Nb | V | Al | N |
| S1 | 18 | 0.08 | 0.25 | 1.60 | 0.015 | 0.005 | — | — | — | — | 0.040 | 0.060 | 0.040 | 0.0050 |
| S2 | 18 | 0.05 | 0.20 | 2.00 | 0.015 | 0.005 | 0.30 | 0.15 | — | 0.50 | 0.065 | — | 0.040 | 0.0050 |
| S3 | 18 | 0.06 | 0.25 | 0.80 | 0.010 | 0.003 | 0.30 | — | — | — | — | 0.030 | 0.030 | 0.0050 |
| S4 | 18 | 0.16 | 0.30 | 1.50 | 0.018 | 0.006 | — | — | — | — | 0.030 | 0.030 | 0.035 | 0.0060 |
| S5 | 18 | 0.09 | 0.30 | 1.65 | 0.016 | 0.004 | — | 0.20 | 0.30 | — | 0.045 | 0.030 | 0.025 | 0.0070 |
| S6 | 18 | 0.08 | 0.25 | 1.06 | 0.013 | 0.007 | 3.45 | — | 0.15 | 0.19 | — | 0.024 | 0.039 | 0.0070 |

TABLE 2

| | Flux composition | | | | | | | | | | |
|---|---|---|---|---|---|---|---|---|---|---|---|
| | Chemical composition (%) | | | | | | | | | CaO + MgO | |
| Symbol | SiO$_2$ | TiO$_2$ | ZrO$_2$ | Al$_2$O$_3$ | MnO | MgO | CaO | CaF$_2$ | BaO | + MnO | Note |
| F1 | 35 | 20 | — | 5 | 10 | 2 | 15 | 10 | — | 27 | for high |
| F2 | 32 | 10 | 6 | 4 | 8 | 2 | 18 | 10 | 6 | 28 | speed |
| F3 | 32 | 8 | 7 | 8 | 5 | 1 | 12 | 15 | 7 | 21 | welding |
| F4 | 20 | 5 | — | 5 | 2 | 8 | 35 | 20 | — | 45 | for high |
| F5 | 26 | 3 | — | 13 | 2 | 1 | 33 | 14 | 6 | 36 | toughness |
| F6 | 25 | 3 | 1 | 13 | 8 | 6 | 17 | 15 | 10 | 31 | |

TABLE 2-continued

| | Flux composition | | | | | | | | | | |
|---|---|---|---|---|---|---|---|---|---|---|---|
| F7 | 31 | 5 | 2 | 11 | 4 | 2 | 28 | 14 | 1 | 34 | Unacceptable |
| F8 | 28 | 5 | 4 | 8 | 13 | 3 | 15 | 13 | 17 | 31 | Example |
| F9 | 29 | 5 | 1 | 5 | 5 | 5 | 15 | 15 | 15 | 25 | Acceptable |
| F10 | 20 | 10 | 2 | 8 | 2 | 2 | 18 | 20 | 15 | 22 | Example |
| F11 | 22 | 8 | 8 | 8 | 7 | 3 | 14 | 10 | 18 | 24 | |
| F12 | 28 | 2 | 8 | 2 | 2 | 2 | 20 | 18 | 14 | 24 | |

| Symbol | $\frac{SiO_2 + TiO_2}{+ ZrO_2}$ | $\frac{CaO + MgO + MnO}{SiO_2 + TiO_2 + ZrO_2}$ | $CaF_2 + BaO$ | F (dyne/cm) | Rate of formation of slag inclusion (%) | Note |
|---|---|---|---|---|---|---|
| F1 | 55 | 0.49 | 10 | 423 | 0 | for high |
| F2 | 48 | 0.64 | 16 | 433 | 0 | speed |
| F3 | 47 | 0.44 | 22 | 422 | 0 | welding |
| F4 | 25 | 1.80 | 20 | 482 | 38 | for high |
| F5 | 29 | 1.24 | 20 | 470 | 20 | toughness |
| F6 | 29 | 1.07 | 25 | 461 | 9 | |
| F7 | 38 | 0.89 | 15 | 459 | 12 | Unacceptable |
| F8 | 37 | 0.84 | 30 | 453 | 2 | Example |
| F9 | 35 | 0.71 | 30 | 428 | 0 | Acceptable |
| F10 | 32 | 0.69 | 35 | 441 | 0 | Example |
| F11 | 38 | 0.63 | 28 | 446 | 0 | |
| F12 | 38 | 0.63 | 32 | 428 | 0 | |

TABLE 3

| Symbol | Wire composition (%) | | | | | | | |
|---|---|---|---|---|---|---|---|---|
| | C | Si | Mn | P | S | Ni | Mo | N |
| Wi | 0.08 | 0.05 | 1.80 | 0.015 | 0.010 | — | — | 0.0060 |
| Wii | 0.08 | 0.30 | 1.00 | 0.016 | 0.008 | — | — | 0.0070 |
| Wiii | 0.08 | 0.25 | 1.50 | 0.015 | 0.008 | — | — | 0.0065 |
| Wiv | 0.08 | 0.25 | 1.50 | 0.014 | 0.006 | — | 0.05 | 0.0066 |
| Wv | 0.08 | 0.28 | 1.50 | 0.016 | 0.006 | — | 1.00 | 0.0061 |
| Wvi | 0.08 | 0.30 | 1.50 | 0.014 | 0.008 | 0.80 | 0.50 | 0.0070 |

From the preliminary test results of FIG. 2, it can be seen that the low-temperature toughness of the weld metal depends upon the minute adjustments of the oxygen content and the carbon equivalent and particularly the carbon equivalent $C_E$ of 0.35–0.43% is acceptable for the improvement of the toughness when the oxygen content of the weld metal is within a range of 0.025–0.035%. However, a few amount of proeutectoid ferrite is precipitated even in the weld metal having a relatively good toughness, which is shown by mark o in FIG. 2, so that such weld metal is still insufficient for use in low-temperature applications. Therefore, it is necessary to further improve the toughness by controlling the formation of proeutectoid ferrite with B. That is, as results obtained in runs using the combinations of fluxes F9 and F10 and B-containing wires W2, 3, 4, 11, 12 and 13, which are listed in the following Table 4, according to the invention as mentioned later are shown by mark ● in FIG. 2, it is important that the oxygen content is 0.025–0.035% and also the carbon equivalent of the weld metal is 0.35–0.43% in order to effectively develop the action of B. Moreover, even when the composition of the weld metal is adjusted as described above, if the C content is not more than 0.10%, the structure consisting mainly of fine acicular ferrite is obtained to provide a high toughness, but if the C content exceeds 0.10%, cementite is formed near austenite grains to lower the toughness, so that a care must be taken in the carbon content of the weld metal.

In the both-side single layer submerged arc welding, a rate of dilution from steel plate is approximately 60–70%, so that 60–70% of the chemical composition of the weld metal is determined by the composition of the steel plate and the balance thereof is determined by the composition of the wire. Moreover, since some of component elements in the steel plate and wire are evaporated by a heat of arc during the welding, decreased by oxidation or increased by reduction in the slag-metal reaction, the composition of the weld metal changes somewhat in accordance with the yield of each element. However, the composition of the weld metal can practically be estimated by a total dilution rate from the steel plate and wire as follows: that is, C is 70–90%, Si is 90–120%, Mn is 80–90%, Mo, Cr and Ni are 90–100%, Ti is 10–30%, Al is 40–60%, B is 10–20% and N is 80–120%.

Accordingly, in order to set each component of the weld metal such as B, Ti or the like in the aforementioned reasonable range, the compositions of the steel plate and wire are determined as follows:

The composition of the steel plate is essentially defined by the use conditions, for instance, performances required for use in steel pipes for pipe-line, but a further limitation of the chemical composition is added in order to satisfy the above mentioned properties as a weld metal through the both-side single layer, high speed submerged arc welding. When the carbon content of the weld metal exceeds 0.1%, undesirable bainite structure is apt to be formed on a part of the weld metal to obstruct the action of B, so that C content in the steel plate as well as the steel wire used in the above welding is limited up to 0.1%. Then, silicon lowers the melting point of the weld metal to improve the fluidity thereof, but if the Si content becomes excessive, the strength of the weld metal is increased to deteriorate the toughness and also Si reacts with oxygen to form $SiO_2$, whereby the oxygen content of the weld metal is increased. Therefore, the Si content is limited up to 0.35% in the steel plate and up to 0.40% in the wire. Furthermore, manganese is necessary to be not less than 0.5% in order to impart sufficient strength and toughness to the steel plate, but the upper limit of Mn is desirable to be 2.0% in order to hold a good site weldability of the steel plate. While, the wire contains 1.0–2.5% of Mn in order to properly adjust the carbon equivalent of the weld metal, but if the Mn content exceeds 2.5%, it is difficult to produce the wire.

The aluminum content is limited to 0.01–0.1% in the steel plate and to 0.015–0.05% in the wire. Al is indispensable for serving that Ti supplied from the wire preferentially reacts with N and O in the weld metal to prevent the bond of B with N and O. In any case, if the Al content is less than the lower limit, the contemplated effect cannot be achieved, while if the Al content exceeds the upper limit, performances of the steel plate and weld metal are damaged.

In the steel plate and wire, the nitrogen content is limited to not more than 0.010% and 0.008%, respectively. If the N content exceeds 0.010% in the steel plate and 0.008% in the wire, respectively, the effect of Ti for controlling the formation of boron nitride as mentioned above is insufficient and the toughness improvement of weld metal by B is no longer achieved.

In order to ensure the performances of the steel plate, Nb, V, Mo, Cr, Cu and Ni may be added as a modifying components. These components may be used in proper amounts in compliance with the application of steel plate, but among them, components effecting the carbon equivalent are particularly limited to ranges satisfying the above defined carbon equivalent.

Boron and titanium are supplied only from the wire. Therefore, in order to satisfy the above defined composition of the weld metal, the B content is 0.01–0.02% and the Ti content is 0.10–0.18% in the wire.

Although the C, Si, Mn, Al and N contents in the wire are mentioned above, nickel, chromium and molybdenum are sometimes used as a selective component inclusive of Si and Mn. Since the steel plate according to the invention contains at least one component selected from Mo≦0.5%, Cr≦0.5%, Cu≦0.5% and Ni≦3.5% in addition to Si≦0.35% and 0.5%≦Mn≦2.0%, the Si, Mn, Ni, Cr and Mo contents of the wire must be adjusted in accordance with the composition of the steel plate in order to provide the carbon equivalent of weld metal of 0.35–0.43%. Particularly, considering the yield of each component as mentioned above and the manufacturability of the wire, the Mn content of the wire is 1.0–2.5% and at least one component selected from Mo≦0.8%, Cr≦0.8% and Ni≦3.0% may be added to the wire. As discussed above, in case of low strength steel plates, C and Mn are small and Mo, Cr, Ni and the like are not added, so that the alloying components of the wire are made larger, but limited to Mn≦2.5%, Mo≦0.8%, Cr≦0.8% and Ni≦3.0% considering the occurrence of cracks in the manufacture of the wire. And also, in case of high strength steel plates, the alloying components of the wire is made smaller, but limited to Mn≦1.0% considering the drawability of the wire.

The invention will now be described in detail with reference to an example.

Steel plates having a thickness of 18 mm and a chemical composition as shown in Table 1 were formed with a 70° double Vee groove on the sides thereof and were subjected at flat position to a both-side single layer submerged arc welding by three electrode process under the same welding conditions as described in the preliminary test of FIG. 2. In this case, a flux as listed in Table 2 was used in combination with a wire having a chemical composition as shown in the following Table 4.

TABLE 4

| Symbol | C | Si | Mn | P | S | Ni | Cr | Mo | Ti | Al | B | N | Note |
|---|---|---|---|---|---|---|---|---|---|---|---|---|---|
| W1 | 0.06 | 0.30 | 1.81 | 0.015 | 0.005 | — | — | 0.58 | 0.16 | 0.035 | 0.0070 | 0.0065 | unacceptable |
| W2 | 0.06 | 0.28 | 1.85 | 0.013 | 0.006 | — | — | 0.62 | 0.18 | 0.045 | 0.0110 | 0.0071 | acceptable |
| W3 | 0.06 | 0.25 | 1.86 | 0.016 | 0.005 | — | — | 0.59 | 0.17 | 0.040 | 0.0150 | 0.0070 | " |
| W4 | 0.06 | 0.29 | 1.80 | 0.012 | 0.005 | — | — | 0.56 | 0.13 | 0.025 | 0.0190 | 0.0061 | " |
| W5 | 0.06 | 0.25 | 1.88 | 0.014 | 0.006 | — | — | 0.60 | 0.14 | 0.031 | 0.0250 | 0.0068 | unacceptable |
| W6 | 0.06 | 0.27 | 1.80 | 0.016 | 0.006 | — | — | 0.65 | 0.08 | 0.042 | 0.0160 | 0.0065 | " |
| W7 | 0.06 | 0.29 | 1.85 | 0.016 | 0.005 | — | — | 0.60 | 0.25 | 0.035 | 0.0155 | 0.0062 | " |
| W8 | 0.06 | 0.32 | 1.90 | 0.013 | 0.004 | — | — | 0.55 | 0.15 | 0.010 | 0.0150 | 0.0070 | " |
| W9 | 0.06 | 0.26 | 1.85 | 0.016 | 0.005 | — | — | 0.57 | 0.14 | 0.060 | 0.0146 | 0.0067 | " |
| W10 | 0.06 | 0.30 | 1.92 | 0.015 | 0.004 | — | — | 0.60 | 0.15 | 0.035 | 0.0152 | 0.0100 | " |
| W11 | 0.06 | 0.29 | 1.00 | 0.015 | 0.004 | — | — | — | 0.15 | 0.040 | 0.0155 | 0.0065 | acceptable |
| W12 | 0.06 | 0.30 | 2.00 | 0.016 | 0.005 | 2.95 | 0.80 | 0.65 | 0.15 | 0.035 | 0.0150 | 0.0070 | " |
| W13 | 0.04 | 0.30 | 1.50 | 0.015 | 0.005 | — | — | 0.50 | 0.16 | 0.040 | 0.0150 | 0.0066 | " |

(1) As to chemical composition of flux

A steel pipe having a length of 12 m was manufactured from the steel plate having a chemical composition as shown by symbol S1 of Table 1. The steel pipe was subjected to the both-side single layer submerged arc welding under the same conditions as described above by using fluxes having various compositions shown in Table 2 and the wire having a composition shown by symbol W3 of Table 4. Thereafter, a relation between the rate of formation of slag inclusion and the value of F was examined every 50 pipes per one run to obtain results shown in the following Table 5 as an example.

TABLE 5

| Run No. | Steel plate used | Flux used | Wire used | Toughness of weld metal vE-25(J) | C | Si | Mn | Mo | Ti | Al | B | N | O | $C_E$ | Note |
|---|---|---|---|---|---|---|---|---|---|---|---|---|---|---|---|
| 1 | S1 | F1 | W3 | 33 | 0.07 | 0.43 | 1.50 | 0.19 | 0.023 | 0.020 | 0.0022 | 0.0069 | 0.0580 | 0.39 | unacceptable |
| 2 | " | F4 | " | 115 | 0.07 | 0.35 | 1.41 | 0.20 | 0.027 | 0.025 | 0.0025 | 0.0072 | 0.0216 | 0.37 | " |
| 3 | " | F9 | " | 118 | 0.07 | 0.38 | 1.47 | 0.19 | 0.024 | 0.022 | 0.0023 | 0.0070 | 0.0330 | 0.38 | acceptable |
| 4 | " | F10 | " | 145 | 0.07 | 0.37 | 1.43 | 0.20 | 0.024 | 0.022 | 0.0024 | 0.0065 | 0.0295 | 0.37 | " |

Chemical composition of weld metal (%)

When using the conventional fluxes F1, 2 and 3 usually used for high speed welding, it can be seen from Table 2 that the F value is not more than 450 dyne/cm and there is no weld defect in the bead. As apparent from the result of run No. 1 using the flux F1 in Table 5, however, the oxygen content is as high as 0.04–0.06%, so that no addition effect of B supplied from the wire is developed and the toughness of the resulting weld metal is low.

When using the conventional fluxes F4, 5 and 6 usually used for high toughness, the toughness of the resulting weld metal is increased by the effective action of B as apparent from the result of run No. 2 of Table 5. However, the F value exceeds 450 as shown in Table 2, so that the slag inclusion is caused.

In case of the flux F7, the contents of $Al_2O_3$ and CaO are slightly higher as apparent from Table 2, so that the F value is 459 and the slag inclusion is caused. On the other hand, the total content of $CaF_2$ and BaO is fairly small, so that the oxygen content of the weld metal becomes as excessive as 0.045–0.050% and consequently the addition effect of B is not effectively developed for the improvement of toughness.

In case of the flux F8, the content of MnO is too high as apparent from Table 2, so that the F value is 453 and the formation of slag inclusion cannot be avoided.

When using the fluxes F9, 10, 11 and 12 according to the invention, the F value is not more than 450 and there is no weld defects in the weld metal. Furthermore, the weld metal has a high toughness and an oxygen content of 0.025–0.035% as shown in run Nos. 3 and 4 of Table 5 using the fluxes F9 and 10.

(2) As to boron content

The same procedure as described above was repeated by using four kinds of the wires W1, 2, 4 and 5 having a different B content as shown in Table 4 in combination with the fluxes F1, 4 and 10 to obtain a result as shown in the following Table 6.

toughness is not improved owing to the excessive B content. Even when using the combination of the flux F1 serving to increase the oxygen content and the wire W5 having a high B content, the toughness is not improved as shown in run No. 9. When using the combination of the flux F4 serving to decrease the oxygen content and the wire W4 according to the invention, bainite is formed on a part of the weld metal and the toughness is not improved as shown in run No. 10.

(3) As to titanium, aluminum and nitrogen contents

When the flux F10 of Table 2 according to the invention was applied to the steel plate S1 of Table 1, if the O and B contents of the weld metal are maintained within ranges of 0.025–0.035% and 0.0015–0.0030%, respectively, the influence of changes of Ti, Al and N contents of the wire on the toughness was examined to obtain a result as shown in the following Table 7.

TABLE 7

| Run No. | Steel plate used | Flux used | Wire used | Toughness of weld metal vE-25(J) | Chemical composition of weld metal (%) | | | | | | | | | $C_E$ | Note |
|---|---|---|---|---|---|---|---|---|---|---|---|---|---|---|---|
| | | | | | C | Si | Mn | Mo | Ti | Al | B | N | O | | |
| 11 | S1 | F10 | W6 | 67 | 0.07 | 0.37 | 1.44 | 0.19 | 0.005 | 0.026 | 0.0024 | 0.0072 | 0.0303 | 0.37 | unacceptable |
| 12 | " | " | W7 | 83 | 0.07 | 0.36 | 1.46 | 0.19 | 0.040 | 0.024 | 0.0024 | 0.0069 | 0.0310 | 0.38 | " |
| 13 | " | " | W8 | 61 | 0.07 | 0.36 | 1.48 | 0.19 | 0.020 | 0.005 | 0.0023 | 0.0070 | 0.0305 | 0.38 | " |
| 14 | " | " | W9 | 89 | 0.07 | 0.37 | 1.45 | 0.19 | 0.018 | 0.040 | 0.0023 | 0.0073 | 0.0278 | 0.38 | " |
| 15 | " | " | W10 | 48 | 0.07 | 0.37 | 1.48 | 0.19 | 0.020 | 0.020 | 0.0023 | 0.0090 | 0.0300 | 0.38 | " |

As apparent from run Nos. 11 and 12 using the wires W6 and 7, the Ti content of the weld metal is 0.005% or 0.040%, which is outside the reasonable range defined by the invention, so that the microstructure of the weld metal is not acicular ferrite and the toughness lowers. Similarly, the toughness is low when the Al content of the weld metal is 0.005% (using the wire W8 of Table 4) or 0.040% (using the wire W9 of Table 4), which being outside the reasonable range defined by the invention, as apparent from run Nos. 13 and 14 of Table 7. Furthermore, when the N content of the weld metal is 0.0090% (using the wire W10 of Table 4) as apparent from run No. 15 of Table 7, the formation of proeutectoid ferrite is not controlled and the toughness is low.

TABLE 6

| Run No. | Steel plate used | Flux used | Wire used | Toughness of weld metal vE-25(J) | Chemical composition of weld metal (%) | | | | | | | | | $C_E$ | Note |
|---|---|---|---|---|---|---|---|---|---|---|---|---|---|---|---|
| | | | | | C | Si | Mn | Mo | Ti | Al | B | N | O | | |
| 5 | S1 | F10 | W1 | 76 | 0.07 | 0.38 | 1.46 | 0.20 | 0.019 | 0.018 | 0.0010 | 0.0065 | 0.0298 | 0.38 | unacceptable |
| 6 | " | " | W2 | 119 | 0.07 | 0.38 | 1.48 | 0.21 | 0.029 | 0.028 | 0.0017 | 0.0060 | 0.0305 | 0.39 | acceptable |
| 7 | " | " | W4 | 130 | 0.07 | 0.37 | 1.45 | 0.19 | 0.017 | 0.013 | 0.0028 | 0.0068 | 0.0300 | 0.38 | " |
| 8 | " | " | W5 | 90 | 0.07 | 0.37 | 1.46 | 0.19 | 0.019 | 0.016 | 0.0040 | 0.0065 | 0.0295 | 0.38 | unacceptable |
| 9 | " | F1 | W5 | 45 | 0.07 | 0.43 | 1.51 | 0.19 | 0.019 | 0.015 | 0.0039 | 0.0070 | 0.0590 | 0.39 | " |
| 10 | " | F4 | W4 | 88 | 0.07 | 0.34 | 1.40 | 0.19 | 0.016 | 0.012 | 0.0031 | 0.0072 | 0.0210 | 0.37 | " |

As apparent from the results of run Nos. 6 and 7 of Table 6 using the combination of the flux F10 and the wires W2 and 4 according to the invention, the B content of the weld metal is within a range of 0.0015–0.0030%, so that the microstructure of the weld metal is acicular ferrite and the toughness is considerably improved.

On the contrary, when using the combination of the flux F10 according to the invention and the wire W1 as shown in run No. 5, the toughness is not improved owing to the shortage of B content. Further, when using the combination of the flux F10 according to the invention and the wire W5 as shown in run No. 8, the In this embodiment, the effect of toughness improvement was examined by increasing or decreasing the Ti, Al or N content of the wire, resulting in that these contents of the weld metal are outside the reasonable range defined by the invention, but it need scarcely be said that the same result is obtained by changing these contents in the steel plate.

(4) As to carbon equivalent of weld metal

The influence of carbon equivalent of weld metal to the toughness was examined to obtain a result as shown in the following Table 8.

TABLE 8

| Run No. | Steel plate used | Flux used | Wire used | Toughness of weld metal vE-25(J) | Chemical composition of steel weld metal (%) | | | | | | | | | | $C_E$ | Note |
|---|---|---|---|---|---|---|---|---|---|---|---|---|---|---|---|---|
| | | | | | C | Si | Mn | Ni | Cr | Mo | Ti | Al | B | N | O | | |
| 16 | S2 | F9 | W3 | 82 | 0.06 | 0.38 | 1.76 | 0.21 | — | 0.49 | 0.025 | 0.024 | 0.0024 | 0.0065 | 0.0325 | 0.50 | unacceptable |
| 17 | S2 | " | W11 | 124 | 0.06 | 0.38 | 1.50 | 0.20 | — | 0.32 | 0.024 | 0.020 | 0.0024 | 0.0070 | 0.0330 | 0.41 | acceptable |
| 18 | S3 | " | W3 | 51 | 0.06 | 0.35 | 1.04 | 0.20 | — | 0.19 | 0.024 | 0.023 | 0.0022 | 0.0066 | 0.0330 | 0.30 | unacceptable |
| 19 | S3 | " | W12 | 120 | 0.06 | 0.35 | 1.20 | 1.18 | 0.25 | 0.21 | 0.025 | 0.022 | 0.0023 | 0.0070 | 0.0335 | 0.41 | acceptable |
| 20 | S5 | " | W3 | 78 | 0.09 | 0.36 | 1.55 | — | 0.21 | 0.21 | 0.026 | 0.023 | 0.0025 | 0.0070 | 0.0320 | 0.45 | unacceptable |
| 21 | S5 | " | W11 | 80 | 0.07 | 0.37 | 1.29 | — | 0.20 | — | 0.024 | 0.020 | 0.0023 | 0.0065 | 0.0330 | 0.34 | unacceptable |
| 22 | S5 | " | W13 | 125 | 0.06 | 0.35 | 1.38 | — | 0.21 | 0.15 | 0.023 | 0.022 | 0.0023 | 0.0066 | 0.0328 | 0.38 | acceptable |
| 23 | S6 | F10 | W13 | 120 | 0.06 | 0.35 | 1.09 | 2.25 | 0.10 | 0.28 | 0.025 | 0.023 | 0.0024 | 0.0068 | 0.0295 | 0.40 | acceptable |

In run No. 3 of Table 5 using the combination of the steel plate S1, the flux F9 and the wire W3, the carbon equivalent of the weld metal is $C_E=0.38\%$ as calculated from the equation (2), so that the toughness is considerably improved. On the contrary, when the steel plate S2 containing larger amounts of Mn and Mo or steel plate S3 containing smaller amounts of alloying components is used in combination with the flux F9 and wire W3, the carbon equivalent of the weld metal is outside the range defined by the invention and the satisfactory toughness is not obtained as apparent from run Nos. 16 and 18 of Table 8. However, when the wire W11 or W12 is used instead of the wire W3, the carbon equivalent of the weld metal is within the defined range of 0.35–0.43% and the high toughness is obtained as apparent from run Nos. 17 and 19 of Table 8.

Further, when the steel plate S5 containing larger amounts of Mn and Cr is used in combination with the flux F9 and the wire W3, 11 or 13, if the carbon equivalent is 0.45% (run No. 20) or 0.34% (run No. 21), outside the reasonable range defined by the invention, the toughness is low, while if the carbon equivalent is 0.38% as shown in run No. 22, the high toughness is obtained. Moreover, when the steel plate S6 containing a high Ni content is used in combination with the flux F10 and wire W13, the high toughness is obtained because the carbon equivalent is within the reasonable range as apparent from run No. 23 of Table 8.

(5) As to carbon content

The influence of the carbon content of the weld metal to the toughness was examined to obtain a result as shown in the following Table 9.

$N \leq 0.0080\%$), so that the high toughness aiming at the invention is not obtained.

As mentioned above, when the both-side single layer submerged arc welding is applied to a coupling of a welding assembled structure of a steel plate for use in low-temperature applications such as UO-press shaped steel pipes or the like for pipe-line at cold districts, according to the invention, not only a sufficiently high toughness, which has never been attained in the use of the conventional flux for high speed welding, can be obtained by using the combination of the welding flux and wire each having a choice chemical composition in accordance with the chemical composition of the steel plate used, but also a higher welding speed, which has never been attained in the use of the conventional high basicity flux for high toughness, can properly be realized without causing the slag inclusion.

What is claimed is:

1. In a process for both-side single layer, high speed submerged arc welding of steel plate for use in low-temperature applications such as steel pipes or other steel structures and containing up to 0.1 wt% of carbon, up to 0.35 wt% of silicon, 0.5 to 2.0 wt% of manganese, 0.01 to 0.1 wt% of aluminum and not more than 0.010 wt% of nitrogen with a welding flux and a welding wire, the improvement in which said welding flux comprises 20 to 30 wt% of $SiO_2$, less than 25 wt% of at least one of $TiO_2$ and $ZrO_2$, 10 to 20 wt% of CaO, less than 10 wt% of at least one of MnO and MgO, not more than 10 wt% of $Al_2O_3$ and 20 to 40 wt% in total of $CaF_2$ and BaO each being not more than 20 wt%, wherein a total amount of acidic components ($SiO_2\%+TiO_2\%+ZrO_2\%$) is 30 to 45 wt%, a total amount of basic com-

TABLE 9

| Run No. | Steel plate used | Flux used | Wire used | Toughness of weld metal vE-25(J) | Chemical composition of weld metal (%) | | | | | | | | | $C_E$ | Note |
|---|---|---|---|---|---|---|---|---|---|---|---|---|---|---|---|
| | | | | | C | Si | Mn | Mo | Ti | Al | B | N | O | | |
| 24 | S4 | F9 | W3 | 65 | 0.12 | 0.38 | 1.46 | 0.21 | 0.024 | 0.022 | 0.0024 | 0.0070 | 0.0335 | 0.43 | unacceptable |
| 25 | " | " | W13 | 69 | 0.11 | 0.38 | 1.35 | 0.16 | 0.025 | 0.023 | 0.0024 | 0.0065 | 0.0329 | 0.39 | " |

As apparent from Table 9, when the C content of the weld metal exceeds 0.10%, even if the carbon equivalent is within the reasonable range (run No. 25), the toughness is degraded due to the increase of precipitated cementite.

Incidentally, the chemical compositions of weld metal listed in run Nos. 13, 14 and 15 of Table 7 correspond to those defined in U.S. Pat. No. 3,867,608, but the Al and N contents are outside the reasonable ranges defined by the invention (Al: 0.010–0.030%, ponents (CaO%+MgO%+MnO%) is 20 to 30 wt% and a weight ratio of the total amount of basic components to the total amount of acidic components is within a range of 0.5 to 0.8; said these components being compounded so that a surface tension F of slag is not more than 450 dyne/cm as calculated from the following equation (1):

$$F=285\times[SiO_2]+380\times[TiO_2]+470\times[ZrO_2]+640\times[Al_2O_3]+653\times[MnO]+512\times[MgO]+602\times[CaO]+400\times[CaF_2]+366\times[BaO] \quad (1)$$

wherein a parenthesis represents a mol fraction of each component; said welding wire is composed of a steel wire containing up to 0.10 wt% of carbon, up to 0.4 wt% of silicon, 1.0 to 2.5 wt% of manganese, 0.015 to 0.05 wt% of aluminum, not more than 0.008 wt% of nitrogen, 0.10 to 0.18 wt% of titanium and 0.01 to 0.02 wt% of boron; said welding flux and welding wire are used in combination with each other so that a carbon equivalent $C_E$ of the resulting weld metal is 0.35 to 0.43% as calculated from the following equation (2):

$$C_E(\%)=C(\%)+1/24Si(\%)+1/6Mn(\%)+\tfrac{1}{4}Mo(\%)+1/5Cr(\%)+1/40Ni(\%)+1/14V(\%) \qquad (2)$$

to thereby obtain a weld metal containing not more than 0.008 wt% of nitrogen, 0.025 to 0.035 wt% of oxygen, 0.0015 to 0.0030 wt% of boron, 0.015 to 0.030 wt% of titanium and 0.010 to 0.030 wt% of aluminum and having a high low-temperature toughness without weld defects.

2. A process according to claim 1, wherein said steel plate further contains at least one component selected from the group consisting of up to 0.1 wt% of niobium, up to 0.1 wt% of vanadium, up to 0.5 wt% of molybdenum, up to 0.5 wt% of chromium, up to 0.5 wt% of copper and up to 3.5 wt% of nickel.

3. A process according to claim 1, wherein said steel wire further contains at least one component selected from the group consisting of up to 0.8 wt% of molybdenum, up to 0.8 wt% of chromium and up to 3.0 wt% of nickel.

* * * * *